UNITED STATES PATENT OFFICE.

WILLIAM DAVID ASHTON BOST, OF PAISLEY, SCOTLAND, ASSIGNOR TO INTERNATIONAL REFRIGERATING INSULATOR SYNDICATE LIMITED, OF PAISLEY, SCOTLAND.

MANUFACTURE OF HEAT-INSULATING COMPOUNDS.

1,044,126.      Specification of Letters Patent.      Patented Nov. 12, 1912.

No Drawing.      Application filed August 2, 1910. Serial No. 575,143.

*To all whom it may concern:*

Be it known that I, WILLIAM DAVID ASHTON BOST, a subject of the King of the United Kingdom of Great Britain and Ireland, and residing at Paisley, Renfrewshire, Scotland, have invented a certain new and useful Improvement in the Manufacture of Heat-Insulating Compounds, of which the following is a specification.

The uses to which charcoal made from whole wood can be put are so varied that there is an immense sale for it: whereas the outlets for charcoal made from sawdust and other small wood, i. e., carbonized wood turnings, shavings, planings and the like, are very restricted; and most of the attempts made to deal with such wood have ended in failure on account of the difficulty of utilizing or disposing of the charcoal from this class of wood. By the present invention it is rendered possible to utilize such charcoal for the production of a new and useful material which can be put on the market as a heat insulating compound. In this respect the invention may be regarded as an improvement on the invention described in Noodt's United States patent specification No. 941585. The said compound is by the invention produced from carbonized "small" wood, i. e., carbonized wood turnings, carbonized sawdust, carbonized shavings or planings and the like; pulp such as used in the manufacture of paper, hereinafter referred to as paper pulp; and, by preference a waterproofer such as resinate of alumina.

The charcoal and pulp are mixed when wet, run into molds or other suitable apparatus and subsequently dried.

It is preferred to mix the charcoal with the pulp in the proportion of four parts by weight of charcoal to one of pulp; and to effect admixture with these ingredients of resinate of alumina of an amount equivalent to 2% or thereabout of the total there is preferably added resinate of soda and sulfate of alumina—the sulfate of soda so formed being drawn off. A proportion of ground pitch, say 20% of the total, may be added to the mixture. For making the paper pulp, "broke" or waste paper may be used.

The chief advantages obtained by the present invention as compared with other processes of manufacturing insulating compounds from charcoal and paper pulp are:— (1) The product of the invention is lighter; and (2) the expense and trouble of breaking the charcoal into fine pieces are avoided.

While the preferred proportions of the ingredients of the improved composition are specified above, it is to be understood that the proportions may be varied within the widest limits.

What I claim is:—

1. A composition of matter consisting of paper pulp, carbonized "small wood," resinate of alumina and ground pitch.

2. A composition of matter consisting of paper pulp, carbonized sawdust, resinate of alumina and ground pitch.

3. The hereindescribed improvement in the manufacture of insulating compound consisting in mixing paper pulp and carbonized "small wood" with resinate of soda and sulfate of alumina, removing the sodium sulfate so formed, and drying the mixture.

4. The hereindescribed improvement in the manufacture of insulating compound consisting in mixing paper pulp and carbonized saw dust with resinate of soda and sulfate of alumina, removing the sodium sulfate so formed, and drying the mixture.

In testimony whereof I have signed my name to this specification in the presence of two subscribing witnesses.

WILLIAM DAVID ASHTON BOST.

Witnesses:
    WALLACE CRANSTON FAIRWEATHER,
    JOHN MCCLEARY.

Copies of this patent may be obtained for five cents each, by addressing the "Commissioner of Patents, Washington, D. C."